Feb. 22, 1927. 1,618,668
E. W. MIKAELSON
DIE HEAD
Filed Jan. 24, 1922 6 Sheets-Sheet 2
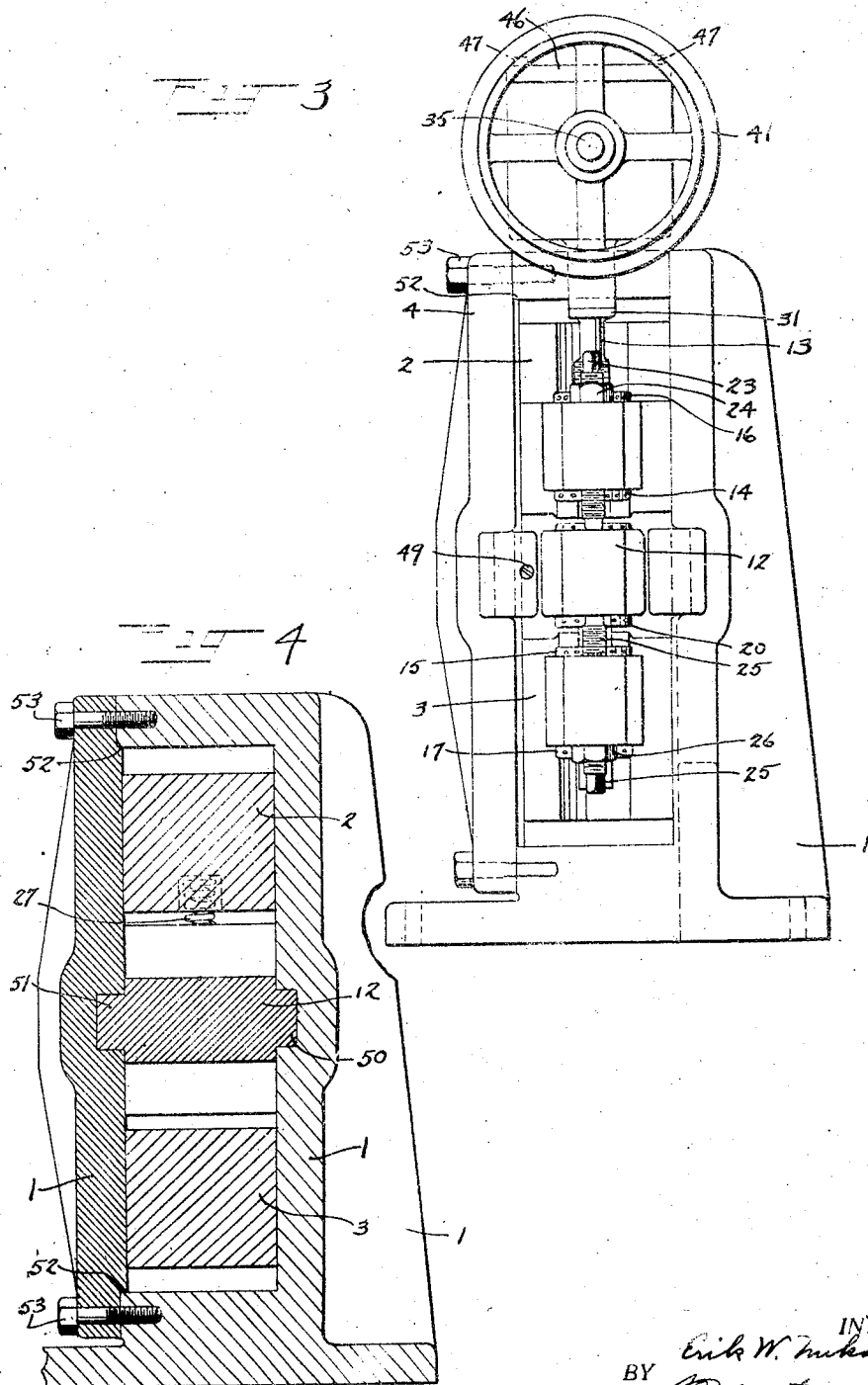
INVENTOR
Erik W. Mikaelson
BY
ATTORNEY Feb. 22, 1927.
E. W. MIKAELSON
DIE HEAD
Filed Jan. 24, 1922
1,618,668
6 Sheets-Sheet 3

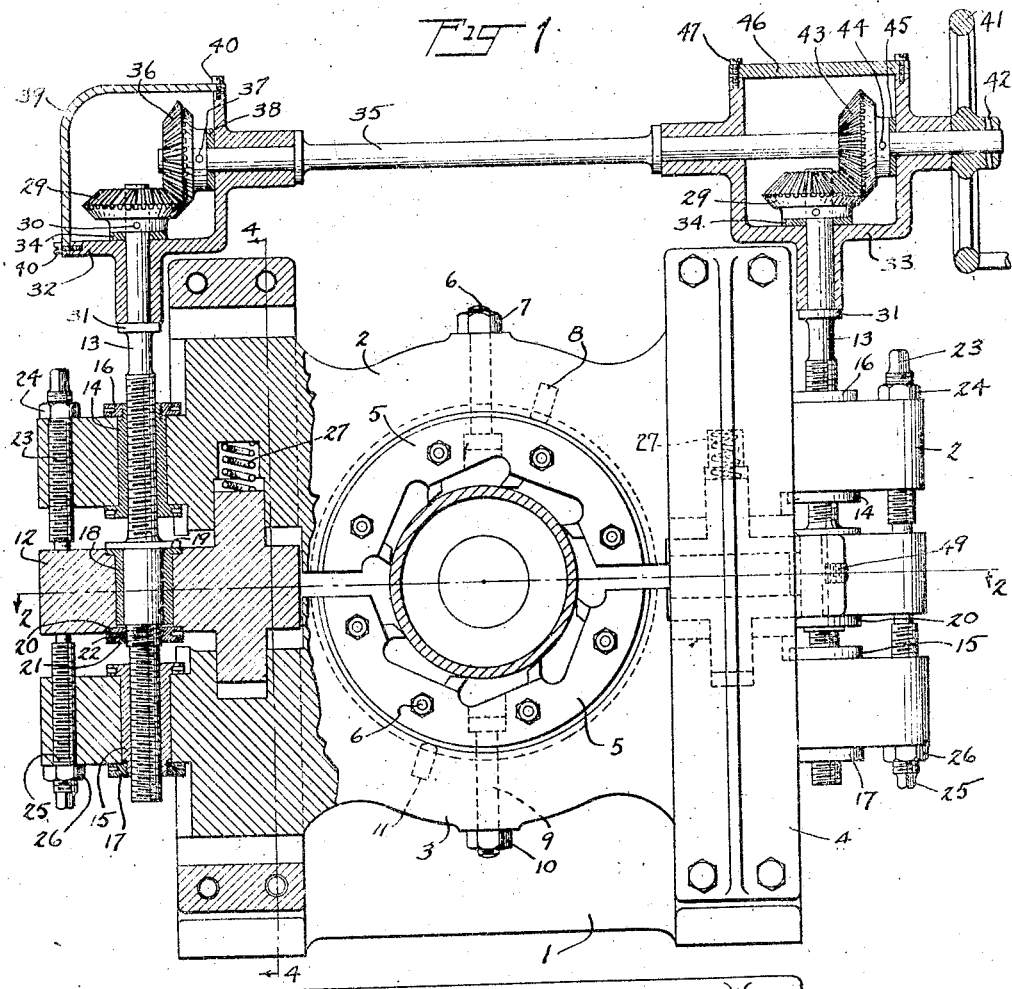

INVENTOR
Erik W. Mikaelson,
BY
ATTORNEY

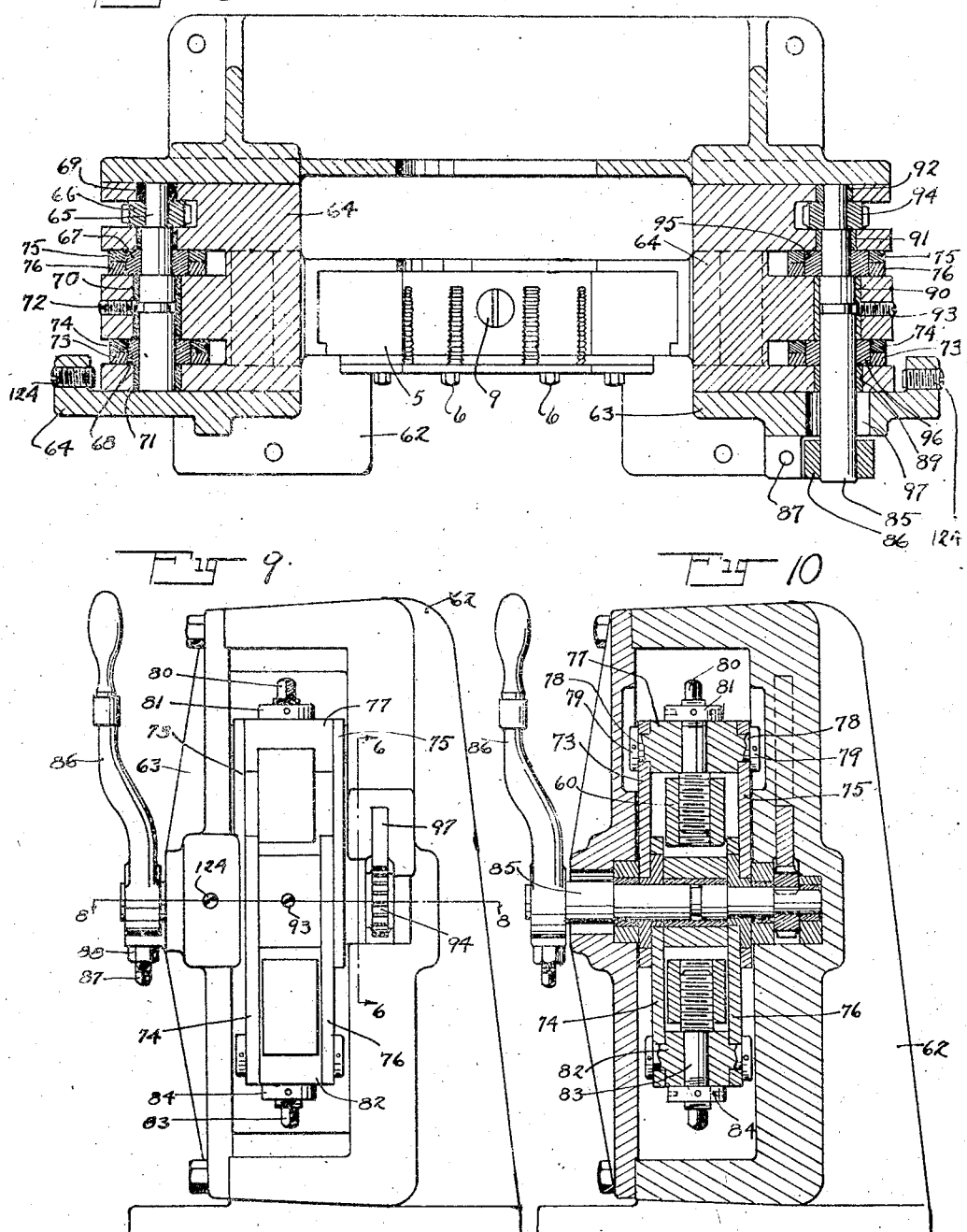

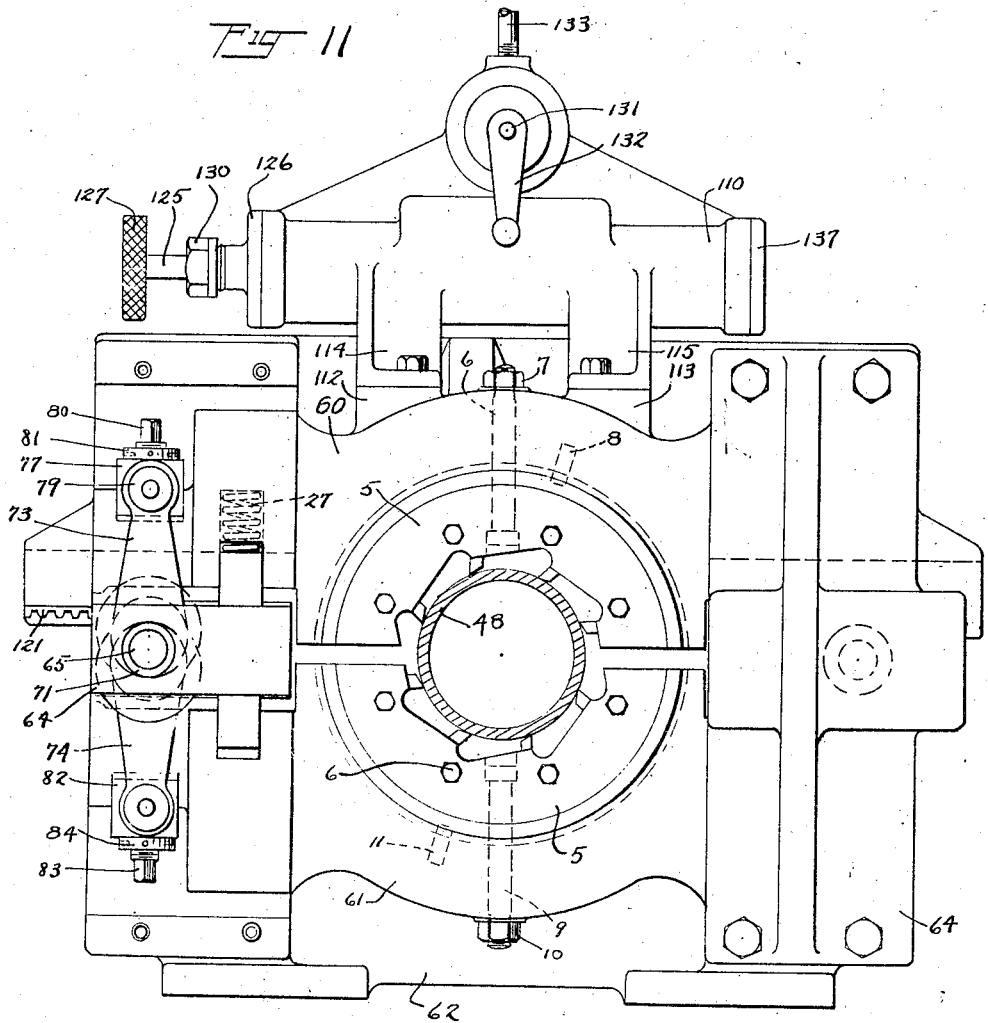

Feb. 22, 1927.
W. MIKAELSON
DIE HEAD
Filed Jan. 24, 1922    6 Sheets-Sheet 6
1,618,668
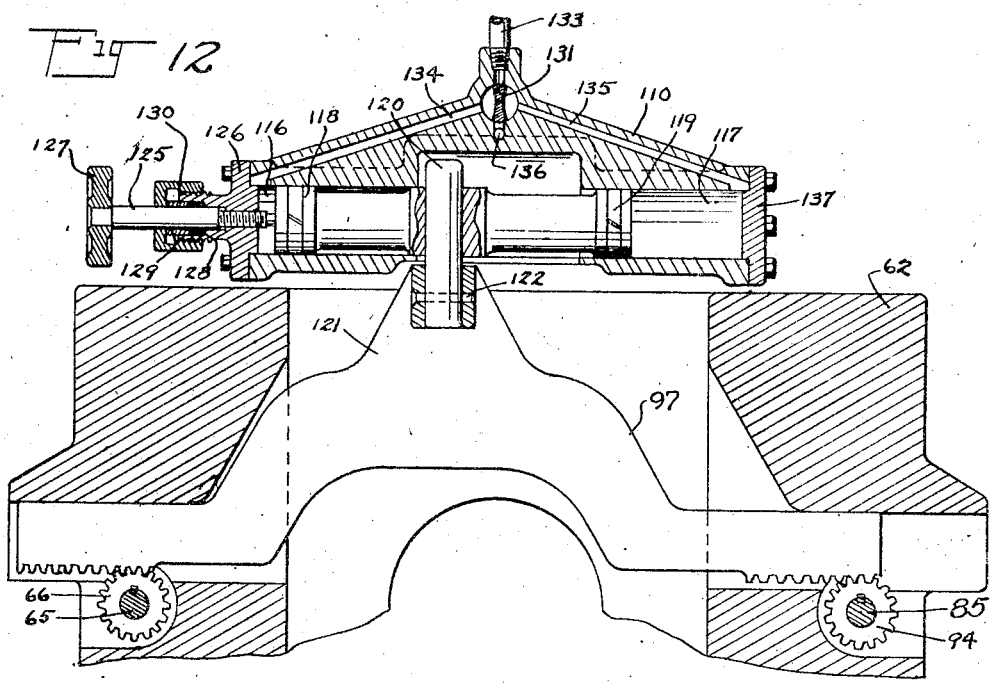
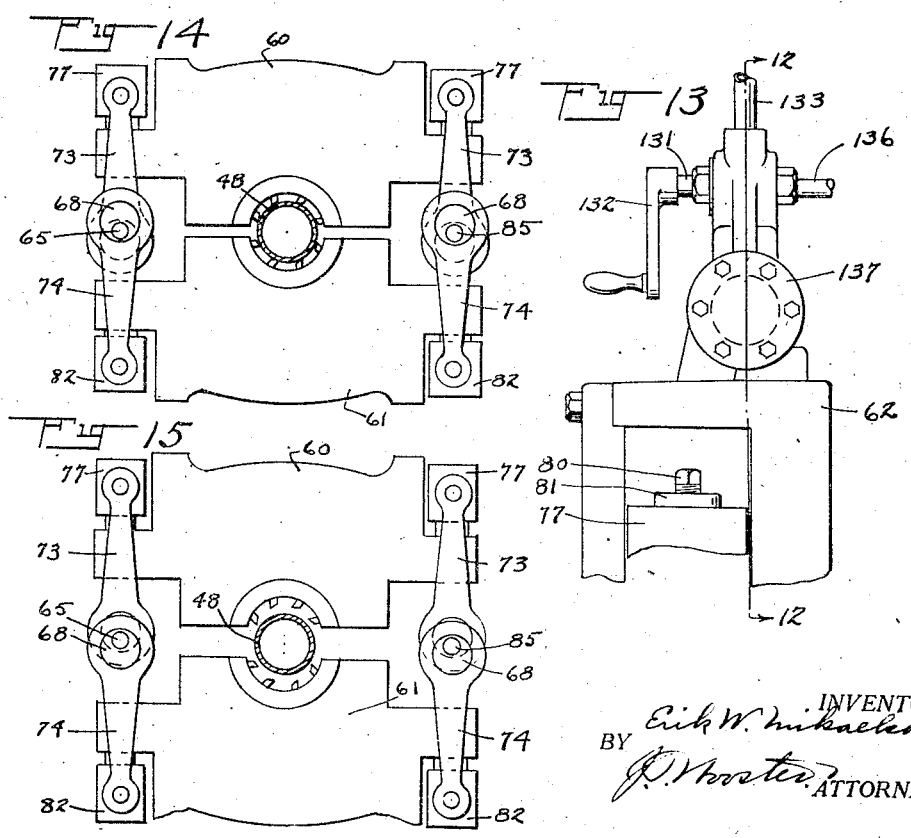

Patented Feb. 22, 1927.

1,618,668

UNITED STATES PATENT OFFICE.

ERIK W. MIKAELSON, OF EASTON, PENNSYLVANIA, ASSIGNOR TO TREADWELL ENGINEERING COMPANY, A CORPORATION OF PENNSYLVANIA.

DIE HEAD.

Application filed January 24, 1922. Serial No. 531,335.

This invention relates to die heads, and has for its object to provide a die head more especially intended for threading pipes, rods, etc., wherein the work is preferably driven and the threading mechanism stationary, with provision for a limited floating movement to accommodate inequality or lack of centering of the work. In order to save time in backing off the completed work, the die head is made to open sufficiently to clear the thread so that the latter can be easily withdrawn, and mechanism is also provided for centering of the chasers and adjustments to take up wear. The chasers are mounted on oppositely moving heads which are mounted to move equally on both sides so as to fully clear the work on both sides, as considerable damage is done both to chasers and the work by die heads of the hinged type which open on one side. On account of the size of the machine, it may be desired to provide power for opening and closing the die, connections for this purpose being shown in various modifications.

In the accompanying drawing—

Figure 5:
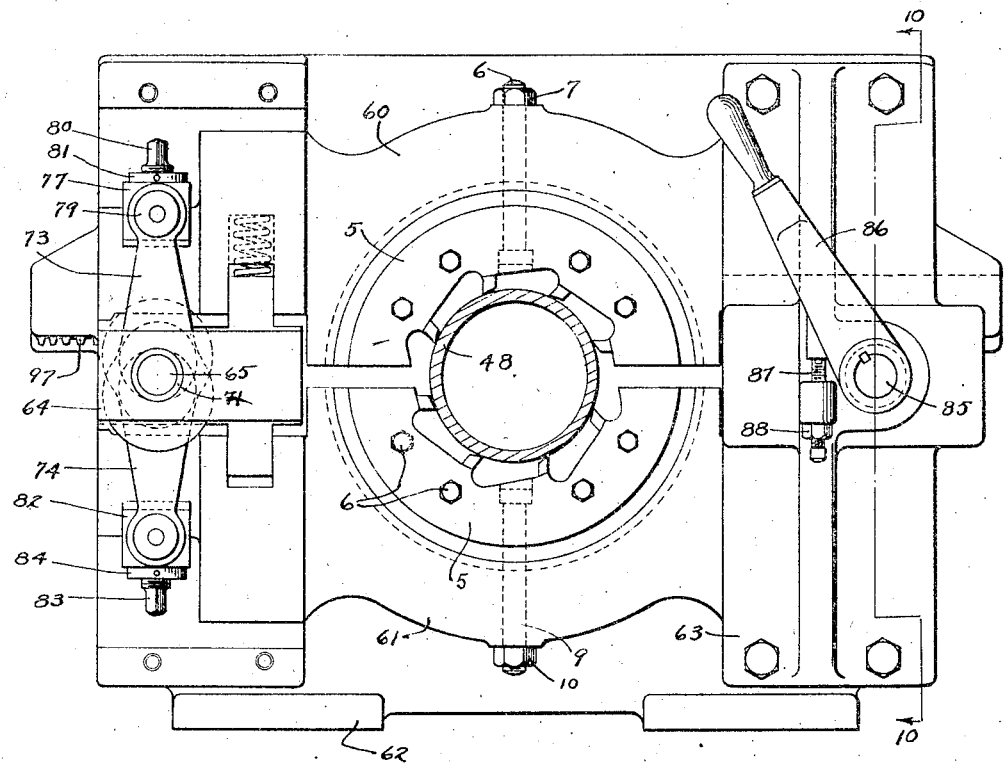
Figure 6:
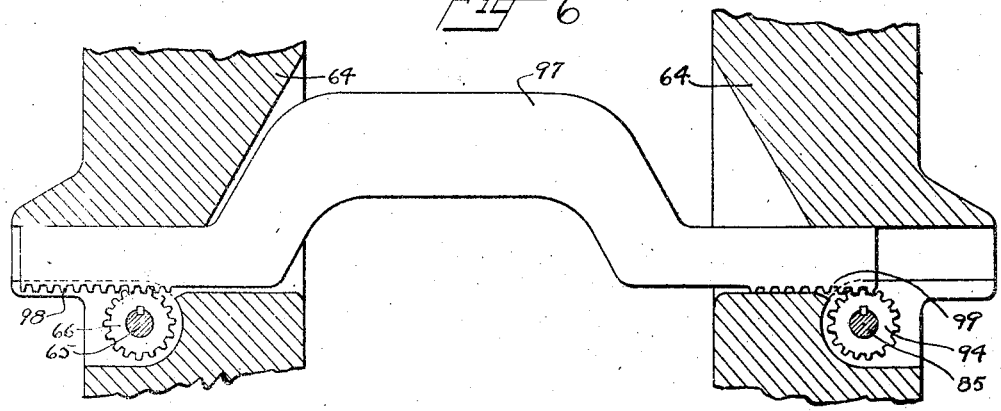
Figure 7:
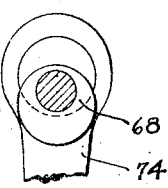

Figure 1 is a vertical section of a hand operated die head embodying the invention, Figure 2 is a section on the line 2—2 of Figure 1, Figure 3 is a side view, Figure 4 is a section on the line 4—4 of Figure 1, Figure 5 is a front view showing a modified form of actuating mechanism, Figure 6 is a section taken on the line 6—6 of Figure 9, Figure 7 is a detail, Figure 8 is a section on the line 8—8 of Figure 9, Figure 9 is a side elevation, Figure 10 is a section on the line 10—10 of Figure 5, Figure 11 is a front view showing a modified actuating mechanism, Figure 12 is a section on the line 12—12 of Figure 13, Figure 13 is a side elevation of the operating cylinder, and Figures 14 and 15 are diagrammatic drawings showing the positions of the operating parts in closed and open positions respectively.

Referring first to Figures 1 to 4, the mechanism comprises a frame 1 having spaced uprights 4 in which slide the upper chaser carrying head 2, and the lower chaser carrying head 3. 5—5 are respectively upper and lower chaser holders fastened to members 2, 3, by bolts 6, 9 and nuts 7, 10, respectively, which are held against rotation by pins 8, 11. The members 2, 3, are relatively vertically movable, but not laterally, being in effect keyed together by a block 12, Figure 1, on each side, provided with compression spring 27, tending to lift the member 2. The springs are resisted by the screws 13 threaded into nuts 14, 15, with opposite threads and the screws 13 are themselves engaged with housings 32 and 33 respectively by means of a collar 31 and with block 12 by means of collar 19 and adjustable nut 20 having a set screw 21 mounted in a transverse bore 22, the central portion of screw 13 passing through bushing 18. When screws 13 are turned, as by hand wheel 41 through shaft 35 and bevel gears 36, 29, and 43, 29, the members 2, 3, move toward or away from each other simultaneously. The hand wheel 41 is held on the shaft by nut 42, the gear 43 is held thereon by pin 44 and gear 36 by pin 37, 38 and 45 being washers, while gear 29 is pinned by pin 30 and spaced by washer 34 from the housing 32 which is provided with cover 39 held by cap screws 40. 46 is a second cover secured to housing 33 by screws 47 for gears 29, 43.

Nuts 14, 15 are fastened in members 2, 3, respectively by lock nuts 16, 17 so as to be held against turning. To limit the approach of the members to each other stop screws 23, 25 are provided, which bear on opposite sides of the faces of block 12 and are held in adjusted positions by set nuts 24 and 26, so that the approach of the chasers toward each other is positively limited. It will be seen that by adjusting one or the other of nuts 14, 15, on screw 13, either chaser member can be adjusted relatively to the horizontal center line, while the wings of block 12 hold both members in vertical alignment. As seen from Figure 2 the entire assembly can float to a limited extent as determined by set screw 49 which controls members 2 and 3 indirectly through block 12, thus putting the controlling force in the same degree upon both members 2, 3, so that the work need not be exactly centered with the center of the die head. This is desirable in machines of this type because on large work it is usually very difficult to exactly center same because of irregularity, etc., which necessity is avoided by this construction. The sectional portion of Figure 1 shows a construction which is similar to the unsectioned portion on the right of Figure 1, so that description of one side will suffice for the other.

As shown in Figure 4 the block 12 has ribs 50, 51 which slide in corresponding grooves in the front and rear frame members on frame 1, this sliding movement being limited as before stated by set screw 49.

In Figures 5 to 15, the opening and closing movement is obtained by means of interconnected eccentrics, wherein members 60, 61 having spaced uprights 63 and a frame 62 correspond to members 2, 3 and the block 64 to block 12. The members are moved toward and from each other by eccentrics 68 on shafts 65, 85, journaled in bushings 69, 70 and 71 which are arranged in aligned bores extending transversely through the blocks 77. The eccentrics 68 operate through connecting rods 73, 74 which are connected to blocks 77, 82, by wrist pins 79, see Figures 14, 15. The shaft 85 carries a hand lever 86 and a pinion 94 which through rack bar 97 actuates the other shaft 65 through pinion 66, the rack teeth being 99, 98 respectively. The approach of members 60, 61 to each other is limited by screw 87 and lock nut 88. Each member 60, 61 is separately adjustable relatively to the other by means of screws 80, 83 respectively in lock collars 81, 84 the screws 80, 83 being threaded into the ends of members 60, 61, it thus being possible to lift or lower either member 60 or 61 on either end by properly adjusting the corresponding set screw, in a manner similar to that before described for the members 2, 3.

The eccentric actuating opening and closing mechanism is somewhat quicker than the screw and gear actuating mechanism of Figure 1, and is also susceptible of being actuated by power, an arrangement using air pressure being shown in Figures 11, 12, 13, wherein 110 represents an air cylinder having end plates or heads 126, 127, the cylinder being provided with supporting lugs 114, and 115 which are rigidly secured to bosses 112 and 113 formed on the upper face of the chaser carrier 60. Pistons 118, 119 are operatively connected to a projection 121 formed on rack bar 97 by a pin 120, which is fastened to the rack bar by a screw 122. The source of air pressure is connected to pipe 133 which leads to a valve chamber 131 operated by handle 132 from which valve chamber passages 134, 135 lead respectively to the cylinder chambers 116, 117. When the valve 131 is open to admit pressure to one side the port 136 is open to exhaust. To regulate the stroke in one direction as for closing the dies, the cylinder head 126 is provided with a screw 125 and hand wheel 127, the screw passing through gland 128 and the internal boss 129 of a removable cap 130 and serves to positively limit the throw of the piston. By adjusting screw 125 the minimum or closed position of the dies can be very accurately determined. To operate the form of Figure 1 by the air cylinder, the gears 29 can be replaced by spur gears and actuated by a rack element similar to rack 97 having teeth on the side.

In each of the forms shown the spring 27 functions to hold the upper die carrying member normally separated, and the blocks 12, 64 serve to key the die carrying members together against relative lateral displacement but permitting lateral movement as a unit in independent separating or closing movement. The blocks carry the actuating mechanism, so that the latter is independent of the floating movement, and in each form the adjustments for each end of each die carrying member are independent. This permits adjustments for wear to be easily made and also accurate lining up of the die carrying members, which when once lined up will require little or no attention by the operator. Likewise in each form the stop screws positively limit the closing movement of the die carrying members, so that the operator simply has to let the die carrying members move as close together as they will go and can be certain that they are in proper position.

Various modifications and changes may be made in the details of construction shown without departing from the scope of the appended claims.

What I claim is:

1. In a machine for cutting screw threads, the combination with a frame, of a pair of die carrying members therein, means for opening and closing said members with a straight line movement, guide means for maintaining said members in alignment and preventing lateral shifting of one relative to the other, said members, guide means and opening and closing means being mounted for limited movement in a different direction from the opening and closing movement of the members, and means for guiding such elements in a predetermined path during the last mentioned movement.

2. In a machine for cutting screw threads, the combination with a plurality of chasing tools, of means for moving at least some of said tools towards and from the work to open and close the tools, means permitting limited movement of all of said tools together in a different direction from the opening and closing of the tools, and means for guiding the tools in said last mentioned movement whereby the tools are constrained to move in a predetermined path.

3. The combination in a die head with a frame, of guide blocks sliding laterally of said frame, die carrying members transversely slidable on said blocks and means for reciprocating said members simultaneously.

4. The combination with a frame carrying die members having their ends held therein, of means connected to the ends of said members for simultaneously opening and closing them, a reciprocable rack member for actuating said means, and a cylinder and piston for actuating said rack member.

5. The combination in a die head with a frame, of guide blocks disposed oppositely in said frame and splined to slide thereon, oppositely disposed die carrying members interlocked on each end with said blocks to slide toward and away therefrom, and die member actuating mechanism for opening and closing the die members and movable with said die members.

6. The combination in a die head with a frame carrying oppositely movable die carrying members and blocks slidable in a direction transversely to the movement of said members, of interlocking sliding connections between the blocks and the die carrying members, and adjusting means between the blocks and members.

7. The combination in a die head with a frame carrying oppositely movable die carrying members and blocks slidable in a fixed direction at an angle to the movement of said members, of sliding interlocking connections between the blocks and members to permit the latter to move oppositely, springs tending to separate the members, and means for holding the members against the spring pressure.

8. The combination in a die head with a frame carrying oppositely movable die carrying members and blocks slidable in a fixed direction at an angle to the movement of said members, of sliding interlocking connections between the blocks and members to permit the latter to move oppositely, springs tending to lift the upper member, means for holding the upper member against the spring pressure, and adjustable means for limiting the closing movement of the members.

9. The combination in a die head with a frame carrying oppositely movable die carrying members and blocks slidable in a fixed direction at an angle to the movement of said members, of sliding interlocking connections between the blocks and members to permit the latter to move oppositely, springs tending to lift the upper member, means for holding the upper member against the springs pressure, and adjustable means carried by each member and cooperating with the respective blocks for limiting the closing movement of the members.

10. The combination in a die head with a frame carrying oppositely movable die carrying members and blocks slidable in fixed direction transversely thereto, of interlocking sliding connections between the blocks and the die carrying members permitting opposite and simultaneous lateral movement of the die carrying members, eccentric means on each block connected to the respective members for moving the members toward and away from each other, and means for simultaneously actuating said means.

11. The combination with a plurality of die carrying members of mechanism for simultaneously moving each of said members in opening and closing, means for limiting the closing movement of said members, means for adjusting said first mentioned means, and means for shifting of both of said members together in a different direction from their opening and closing movement.

12. The combination in a die head with a frame carrying oppositely movable die carrying members and blocks slidable in fixed direction transversely thereto, of interlocking sliding connections between the blocks and the die carrying members permitting opposite and simultaneous lateral movement of the die carrying members, eccentric means on each block connected to the respective members for moving the members toward and away from each other, and means comprising an air cylinder and a reciprocating rack for simultaneously actuating said means.

13. The combination in a die head with a frame, of guide blocks sliding laterally of said frame, die carrying members transversely slidable on said blocks, and means carried by the blocks for reciprocating said members simultaneously.

14. The combination in a die head with a frame, of guide blocks sliding laterally of said frame, die carrying members transversely slidable on said blocks, springs between each block and the upper die carrying member for separating the latter, means for adjusting each end of each member relatively to the block, and means for opening and closing the members.

15. The combination in a die head with a frame, of guide blocks sliding laterally of said frame, die carrying members transversely slidable on said blocks, springs between each block and the upper die carrying member for separating the latter, means for adjusting each end of each member relatively to the block, an air cylinder connected to open and close the members, and means for varying the stroke to determine the closed position.

16. The combination in a die head with a frame carrying oppositely movable die carrying members and blocks slidable in a fixed direction transversely thereto, of interlocking sliding connections between the blocks and the die carrying members permitting opposite and simultaneous lateral movement of the members.

17. In a machine for cutting screw threads, the combination with a pair of die heads, of means for moving each of said heads toward and from the work, guide means along which said movement takes place, said die heads being mounted for limited movement laterally of the opening and closing movement thereof, and means for guiding said die heads in said last mentioned movement in a predetermined path.

Signed at Easton in the county of Northampton and State of Pennsylvania this 17th day of January, A. D. 1922.

ERIK W. MIKAELSON.